(12) United States Patent
Kobayashi et al.

(10) Patent No.: US 9,560,311 B2
(45) Date of Patent: Jan. 31, 2017

(54) VIDEO SIGNAL ENCODING APPARATUS AND VIDEO SIGNAL ENCODING METHOD

(71) Applicant: FUJITSU LIMITED, Kawasaki-shi, Kanagawa (JP)

(72) Inventors: Shunsuke Kobayashi, Fukuoka (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 780 days.

(21) Appl. No.: 13/923,116

(22) Filed: Jun. 20, 2013

(65) Prior Publication Data

US 2013/0278823 A1 Oct. 24, 2013

Related U.S. Application Data

(63) Continuation of application No. PCT/JP2010/073826, filed on Dec. 29, 2010.

(51) Int. Cl.
*H04N 19/186* (2014.01)
*H04N 19/40* (2014.01)
(Continued)

(52) U.S. Cl.
CPC .......... *H04N 7/0102* (2013.01); *H04N 19/186* (2014.11); *H04N 19/40* (2014.11);
(Continued)

(58) Field of Classification Search
CPC .... H04N 7/0102; H04N 19/186; H04N 19/40; H04N 19/70; H04N 19/80; H04N 19/85
(Continued)

(56) References Cited

U.S. PATENT DOCUMENTS 5,027,194 A * 6/1991 Scheffler ................ H04N 9/646
348/607
2006/0262206 A1* 11/2006 Lee .......................... G06T 5/20
348/241

(Continued)

FOREIGN PATENT DOCUMENTS

| JP | 2000-92512 | 3/2000 |
|---|---|---|
| JP | 2005-123913 | 5/2005 |
| JP | 2009-246929 | 10/2009 |

OTHER PUBLICATIONS

PCT International Preliminary Report on Patentability and Written Opinion of the International Searching Authority issued Jul. 2, 2013 in corresponding International Application No. PCT/JP2010/073826.

(Continued)

*Primary Examiner* — William C Vaughn, Jr.
*Assistant Examiner* — Jae N Noh
(74) *Attorney, Agent, or Firm* — Staas & Halsey LLP

(57) ABSTRACT

A processor converts an input video signal via a first filter, and outputs a video signal for a determination obtained by converting the video signal via a second filter. Both filters satisfy a stipulated condition. The processor calculates the degree of matching between the input video signal and the video signal for the determination. The processor determines whether or not the input video signal has been converted by using a filter that satisfies the stipulated condition in conversion at a preceding stage. The processor generates an encoded string by encoding the video signal in the second format converted via the first filter, and the determination result. In this way, whether or not and where a video is that converted by using a filter different from a stipulated filter can be automatically determined.

15 Claims, 19 Drawing Sheets

(51) Int. Cl.
*H04N 19/80* (2014.01)
*H04N 7/01* (2006.01)
*H04N 19/70* (2014.01)
*H04N 19/85* (2014.01)

(52) U.S. Cl.
CPC ............. *H04N 19/70* (2014.11); *H04N 19/80* (2014.11); *H04N 19/85* (2014.11)

(58) Field of Classification Search
USPC .................................................... 375/240.01
See application file for complete search history.

(56) References Cited

U.S. PATENT DOCUMENTS

| 2008/0024513 | A1* | 1/2008 | Raveendran ............ G06T 5/007 345/589 |
| 2009/0231487 | A1 | 9/2009 | Nakagawa et al. |
| 2010/0046612 | A1* | 2/2010 | Sun ...................... H04N 19/149 375/240.02 |
| 2013/0188744 | A1* | 7/2013 | Van der Auwera ........... H04N 19/00903 375/240.29 |

OTHER PUBLICATIONS

International Search Report mailed Mar. 15, 2011 for corresponding International Application No. PCT/JP2010/073826.

\* cited by examiner

|      | $h_{-3}$ | $h_{-2}$ | $h_{-1}$ | $h_0$ | $h_1$ | $h_2$ | $h_3$ | $h_4$ |
|------|------|------|------|-----|-----|-----|-----|-----|
| A(Z) | −8   | −26  | 115  | 586 | 409 | −48 | −4  | 0   |

|      | $h_{-4}$ | $h_{-3}$ | $h_{-2}$ | $h_{-1}$ | $h_0$ | $h_1$ | $h_2$ | $h_3$ |
|------|------|------|------|------|------|-----|------|-----|
| P(Z) | 24   | −76  | −41  | 783  | 1169 | 330 | −128 | −13 |

F I G. 2

|      | $h_{-3}$ | $h_{-2}$ | $h_{-1}$ | $h_0$ | $h_1$ | $h_2$ | $h_3$ | $h_4$ |
|------|------|------|------|------|------|------|------|------|
| A(Z) | -3 | -19 | 34 | 500 | 500 | 34 | -19 | -3 |

|      | $h_{-4}$ | $h_{-3}$ | $h_{-2}$ | $h_{-1}$ | $h_0$ | $h_1$ | $h_2$ | $h_3$ |
|------|------|------|------|------|------|------|------|------|
| P(Z) | 19 | -135 | 103 | 1037 | 1037 | 103 | -135 | 19 |

F I G. 4

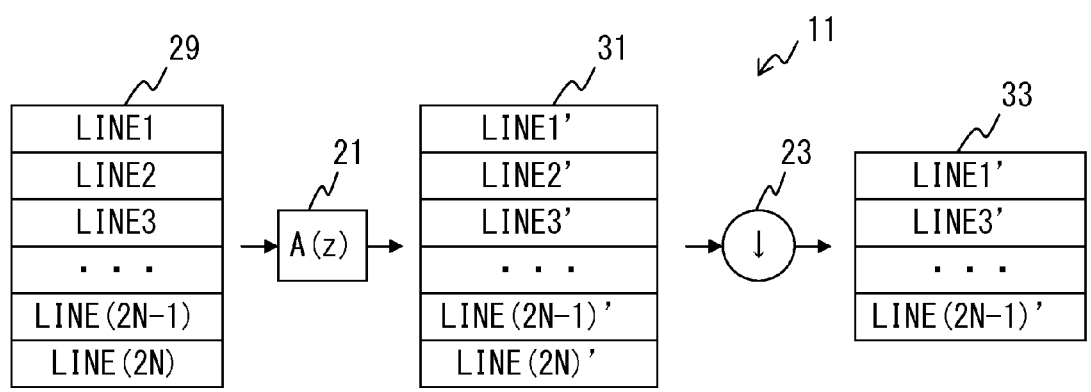
F I G. 7

| user_data_unregistered (payloadSize) { | C | Descriptor |
|---|---|---|
| uuid_iso_iec_11578 | 5 | u(128) |
| for (i = 16; i < payloadSize; i++) | | |
| user_data_payload_byte | 5 | b(8) |
| } | | |

F I G. 9

| user_data_unregistered (payloadSize) { | C | Descriptor |
|---|---|---|
| uuid_iso_iec_11578 | 5 | u(128) |
| for (i = 16; i < 17; i++) | | |
| prf_used_flag | 5 | b(8) |
| } | | |

FIG. 10

| seq_parameter_set_rbsp() { | C | Descriptor |
|---|---|---|
| OMITTED | | |
| vui_parameters_present_flag | 0 | u(1) |
| if (vui_parameters_present_flag) | | |
| vui_parameters() | 0 | |
| OMITTED | | |
| } | | |

F I G. 1 5

| seq_parameter_set_rbsp() { | C | Descriptor |
|---|---|---|
| OMITTED | | |
| vui_parameters_present_flag | 0 | u(1) |
| if (vui_parameters_present_flag) | | |
| prf_used_flag | 0 | |
| OMITTED | | |
| } | | |

67

F I G. 16

| Syntax | No. of bits | Mnemonic |
|---|---|---|
| TS_program_map_section() { | | |
|   OMITTED | | |
|   for (i = 0; i < N; i++) { | | |
|     descriptor() | | |
|   } | | |
|   for (i = 0; i < N1; i++) { | | |
|     OMITTED | | |
|     for (j = 0; j < N2; j++) { | | |
|       descriptor() | | |
|     } | | |
|   } | | |
|   OMITTED | | |
| } | | |

F I G. 1 7

| Syntax | No. of bits | Mnemonic |
|---|---|---|
| prf_used_flag_descriptor() { | | |
|     descriptor_tag | 8 | uimsbf |
|     descriptor_length | 8 | uimsbf |
|     prf_used_flag | 1 | bslbf |
|     reserved | 7 | bslbf |
| } | | |

F I G. 1 8

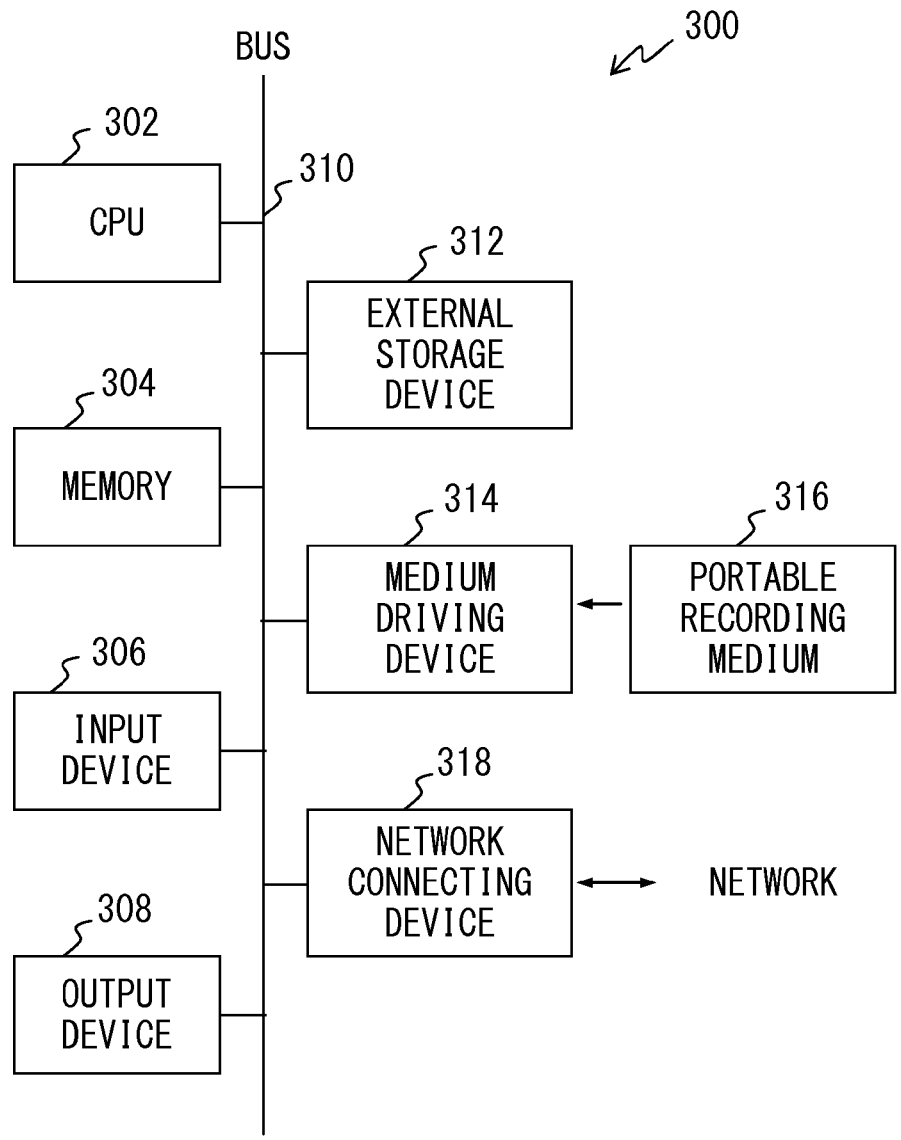
F I G. 19

US 9,560,311 B2

VIDEO SIGNAL ENCODING APPARATUS AND VIDEO SIGNAL ENCODING METHOD

CROSS-REFERENCE TO RELATED APPLICATION

This application is a continuation application of International Application PCT/JP2010/073826 filed on Dec. 29, 2010 and designated the U.S., the entire contents of which are incorporated herein by reference.

FIELD

The embodiments discussed herein are related to a video signal encoding apparatus and a video signal encoding method.

BACKGROUND

As video signals respectively including a luminance signal and two color-difference signals, for example, video signal respectively in a YUV422 format and a YUV420 format, which are transmitted by High Definition-Signal Digital Interface (HD-SDI) or the like, are present. In the video signals in the YUV422 format and the YUV420 format, resolutions of color-difference signals are different. The YUV422 format is a format implemented by taking color-difference samples relative to luminance samples at a ratio of 2:1 in a horizontal direction although the number of color-difference samples in a vertical direction is the same as the number of luminance samples. The YUV420 format is a format implemented by taking color-difference samples relative to luminance samples at 2:1 in both the vertical and the horizontal directions.

Input/output systems of devices used within a broadcasting station are integrated to transmit a video signal in the YUV422 format with HD-SDI. However, encoding/decoding apparatuses support only the YUV420 format in many cases. Accordingly, when a video signal is repetitively encoded and decoded to relay or edit a video, conversion between the YUV422 and the YUV420 is repeated within the apparatuses. Conventionally, there was a problem in that color-difference signals are significantly degraded by repetitively performing conversion between the YUV422 and the YUV420 as described above, leading to blurring of colors.

However, it is known that such a problem can be solved by selecting between a first low-pass filter for down-sampling used to convert between the YUV422 and the YUV420 and a second low-pass filter for up-sampling. Namely, by adopting filters that respectively satisfy a specified condition as first and second low-pass filters at all times, position shifts of color-difference pixels can be reduced to a minimum even if the above described conversion is repetitively performed.

Patent Document 1: Japanese Laid-open Patent Publication No. 2009-246929

SUMMARY

A video signal encoding apparatus in one aspect comprises a processor: configured to convert an input video signal in a first format having a luminance component and two color-difference components into a video signal in a second format having a lower resolution of a color-difference component than the video signal in the first format by using a first filter of one pair of filters that satisfy a stipulated condition, and to output a video signal for a determination by converting the video signal in the second format into the first format by using a second filter of the one pair of filters that satisfy the stipulated condition; calculating a degree of matching between the input video signal and the video signal for the determination; configured to determine whether or not the input video signal has been converted by using the one pair of filters that satisfy the stipulated condition in accordance with the degree of matching, and to output a determination result; and configured to generate an encoded string by encoding the video signal in the second format and the determination result, wherein the stipulated condition is to be a reconstruction filter that enables a position shift of a color-difference pixel to fall within a specified error range even when a video signal having a luminance component and two color-difference components is repetitively converted between the first format and the second format.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a table representing one example of filter coefficients of stipulated filters for an interlaced top field according to the first embodiment.

FIG. 4 illustrates a table representing one example of filter coefficients of stipulated filters for a progressive method according to the first embodiment.

FIG. 7 is an explanatory diagram of conversion of a video signal from a YUV422 format into a YUV420 format via a stipulated low-frequency analysis filter $A(z)$ according to the first embodiment.

FIG. 9 illustrates a table representing syntax related to encoding of a determination result according to the first embodiment.

FIG. 10 illustrates a table representing syntax related to encoding of a determination result according to the first embodiment.

FIG. 15 illustrates a table representing syntax related to encoding of a determination result according to a third embodiment.

FIG. 16 illustrates a table representing syntax related to encoding of a determination result according to the third embodiment.

FIG. 17 illustrates a table representing syntax related to encoding of a determination result according to a fourth embodiment.

FIG. 18 illustrates a table representing syntax related to encoding of a determination result according to the fourth embodiment.

FIG. 19 illustrates one example of a computer for performing operations of the video encoding apparatus with a program.

DESCRIPTION OF EMBODIMENTS

The above described conventional video encoding/decoding apparatus has the following problem.

When encoding and decoding are repetitively performed as described above, the aforementioned filter satisfying a condition of being a perfect reconstruction filter that can reduce a position shift of a color-difference pixel to a minimum is not always used. If a filter set composed of one pair of filters that satisfy the above described same condition, degradation of a color of a video image does not become problematic. However, if a filter that does not satisfy the above described condition is used while encoding and decoding are being repetitively performed, the filter degrades the color. However, a position of a video signal where a color is degraded cannot be automatically determined and is only identified with human eyes. Moreover, there is no means for automatically determining whether or not a video image is that converted by using a filter that satisfies the above described condition based on only the video image.

Preferred embodiments of the present invention will be explained with reference to accompanying drawings.

Figure 1:
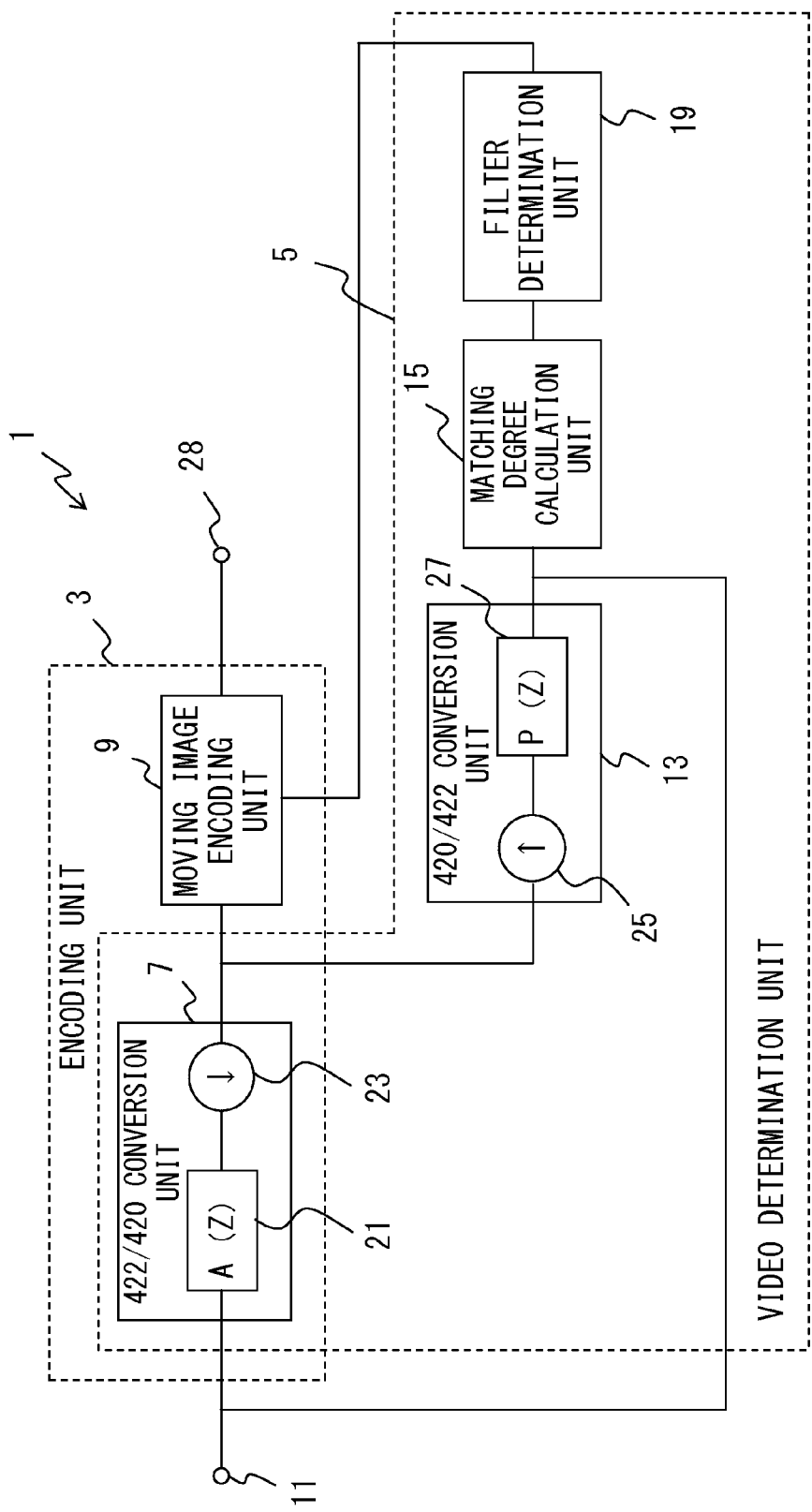
FIG. 1 is a block diagram illustrating a configuration of a video encoding apparatus according to a first embodiment.

(First Embodiment) A video signal encoding apparatus, a video signal encoding method and program according to a first embodiment are described below with reference to the drawings. FIG. 1 is a block diagram illustrating a configuration of a video encoding apparatus 1 according to the first embodiment. The video encoding apparatus 1 has functions of an encoding unit 3 and a video determination unit 5.

The encoding unit 3 includes a 422/420 conversion unit 7 and a moving image encoding unit 9. The 422/420 conversion unit 7 includes a low-frequency analysis filter A(z) 21 and a down-sampling unit 23, and converts a video signal in a YUV422 format into that in a YUV420 format with filtering and down-sampling. The 422/420 conversion is a reduction process of color-difference component signals within a video signal.

The low-frequency analysis filter A(z) 21 filters an input video signal in the YUV422 format under a specified condition. Details of the low-frequency analysis filter A(z) 21 will be described later. The down-sampling unit 23 down-samples a color-difference component of the filtered input video image at 2:1 in a vertical direction. The moving image encoding unit 9 encodes the image converted into the YUV420 format, for example, in conformity with International Telecommunication Union Telecommunication standardization sector (ITU-T) H.264 along with a determination result to be described later.

The video determination unit 5 includes the 422/420 conversion unit 7 shared by the encoding unit 3, a 420/422 conversion unit 13, a matching degree calculation unit 15, and a filter determination unit 19. The 420/422 conversion unit 13 includes an up-sampling unit 25 and a low-frequency synthesis filter P(z) 27. The 420/440 conversion is an expansion process of color-difference component signals within a video signal.

The up-sampling unit 25 up-samples a color-difference component of the video signal in the YUV420 format converted by the 422/420 conversion unit 7 at 1:2 in the vertical direction. The low-frequency synthesis filter P(z) 27 generates a video signal in the YUV422 format by filtering the up-sampled video signal under a specified condition. The video signal generated at this time is referred to as a video signal for a determination.

The matching degree calculation unit 15 calculates the degree of matching based on an absolute value of a difference between pixel values of color-difference components of corresponding pixels of the input video signal and the video signal for the determination. Details of the degree of matching will be described later. The filter determination unit 19 determines whether or not an input video image has been converted by a stipulated filter at a preceding stage by determining, based on the degree of matching calculated by the matching degree calculation unit 15, whether or not a difference between the input video signal and the video signal for the determination falls within a specified range.

Details of the low-frequency analysis filter A(z) 21 and the low-frequency synthesis filter P(z) 27 are described here. The low-frequency analysis filter A(z) 21 and the low-frequency synthesis filter P(z) 27 are one pair of perfect reconstruction filters that can reduce a position shift of a color-difference pixel to a minimum even when conversion between the YUV422 format and the YUV420 format is repetitively performed via these filters. Here, assume that z conversion of the low-frequency analysis filter A(z) 21 and that of the low-frequency synthesis filter P(z) 27 are respectively A(z) and P(z). At this time, the low-frequency analysis filter A(z) 21 and the low-frequency synthesis filter P(z) 27, which are intended for an interlaced top field, are filters that satisfy at least the following conditions 1 to 3 at the same time.

(Condition 1) The following equations 1a, 1b, and 1c, which are complete reconfigurable conditions, are satisfied.

$$P(1)=2 \qquad \text{(equation 1a)}$$

$$A(1)=1 \qquad \text{(equation 1b)}$$

$$A(z) \cdot P(z) + A(-z) \cdot P(-z) = 2 \cdot z^{-2N} \qquad \text{(equation 1c)}$$

where N is an arbitrary integer.

(Condition 2) A coefficient of the low-frequency analysis filter A(z) culculates a pixel value at a position where each pixel is internally divided nearly at 1:3. Namely, a coefficient of the low-frequency analysis filter A(z) is a value of a remainder that is close to 0.25(such as 0.25±0.05) and obtained by adding 1 to a group delay at a frequency ω=0.

(Condition 3) A sum of a group delay of a filter P' (z) normalized by multiplying coefficients of the low-frequency synthesis filter P(z) for up-sampling respectively by 0.5 so that a sum of the coefficients results in 1, and a group delay of A(z) is a value nearly close to an integer at ω=0 or in its neighborhood.

Here, "calculating a pixel value at a position where each pixel internally divided nearly at 1:3" is to calculate a color-difference component after being converted by the low-frequency analysis filter A(z) as a pixel value at a position internally divided at 1:3 relative to positions of two pixels arranged in the vertical direction before being converted. Moreover, "obtaining a remainder by adding 1" is to adopt a value of a result obtained by adding an integer if the result becomes equal to or larger than 0 and smaller than 1. Note that a low-frequency analysis filter and a low-frequency synthesis filter, which are intended for a bottom field, are filters implemented by replacing high-order and low-order coefficients of the above described low-frequency analysis filter A(z) and low-frequency synthesis filter P(z) each other.

Satisfying the above described conditions 1 to 3 at the same time is hereinafter assumed as one example of a stipulated condition, and a filter that satisfies the stipulated condition, such as the low-frequency analysis filter A(z) 21, the low-frequency synthesis filter P (z) 27 and the like, is referred to as a stipulated filter.

Figure 3:
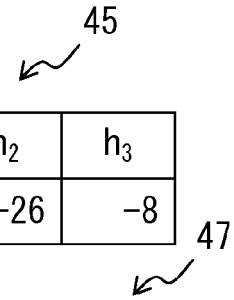
FIG. 3 illustrates a table representing one example of filter coefficients of stipulated filters for an interlaced bottom field according to the first embodiment.

FIGS. 2 and 3 illustrate tables respectively representing one example of filter coefficients of stipulated filters used in an interlace method. As illustrated in FIG. 2, examples represented by a table 41 and a table 43 can be used respectively as the low-frequency analysis filter A(z) 21 and the low-frequency synthesis filter P(z) 27, which are intended for an interlace top field. Moreover, as illustrated in FIG. 3, examples represented by a table 45 and a table 47 can be used respectively as the low-frequency analysis filter A(z) 21 and the low-frequency synthesis filter P(z) 27, which are intended for an interlace bottom field. When a video signal of an interlace method is handled, filters for a top field and a bottom field may be separately provided, and may be switched, for example, by providing a switch.

As stipulated filters for a progressive method, examples illustrated in FIG. 4 are present. As illustrated in FIG. 4, examples represented by a table 49 and a table 51 can be used respectively as the low-frequency analysis filter A(z) 21 and the low-frequency synthesis filter P(z) 27, which are intended for the progressive method. In FIGS. 2 to 4, all filter coefficients are represented by being multiplied by 1024.

Figure 5:
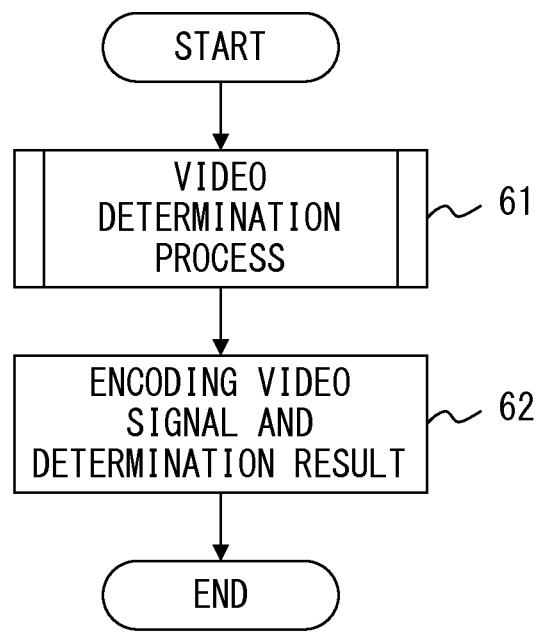
FIG. 5 is a flowchart illustrating operations of a determination and encoding of a video signal in a video encoding apparatus according to the first embodiment.
Figure 6:
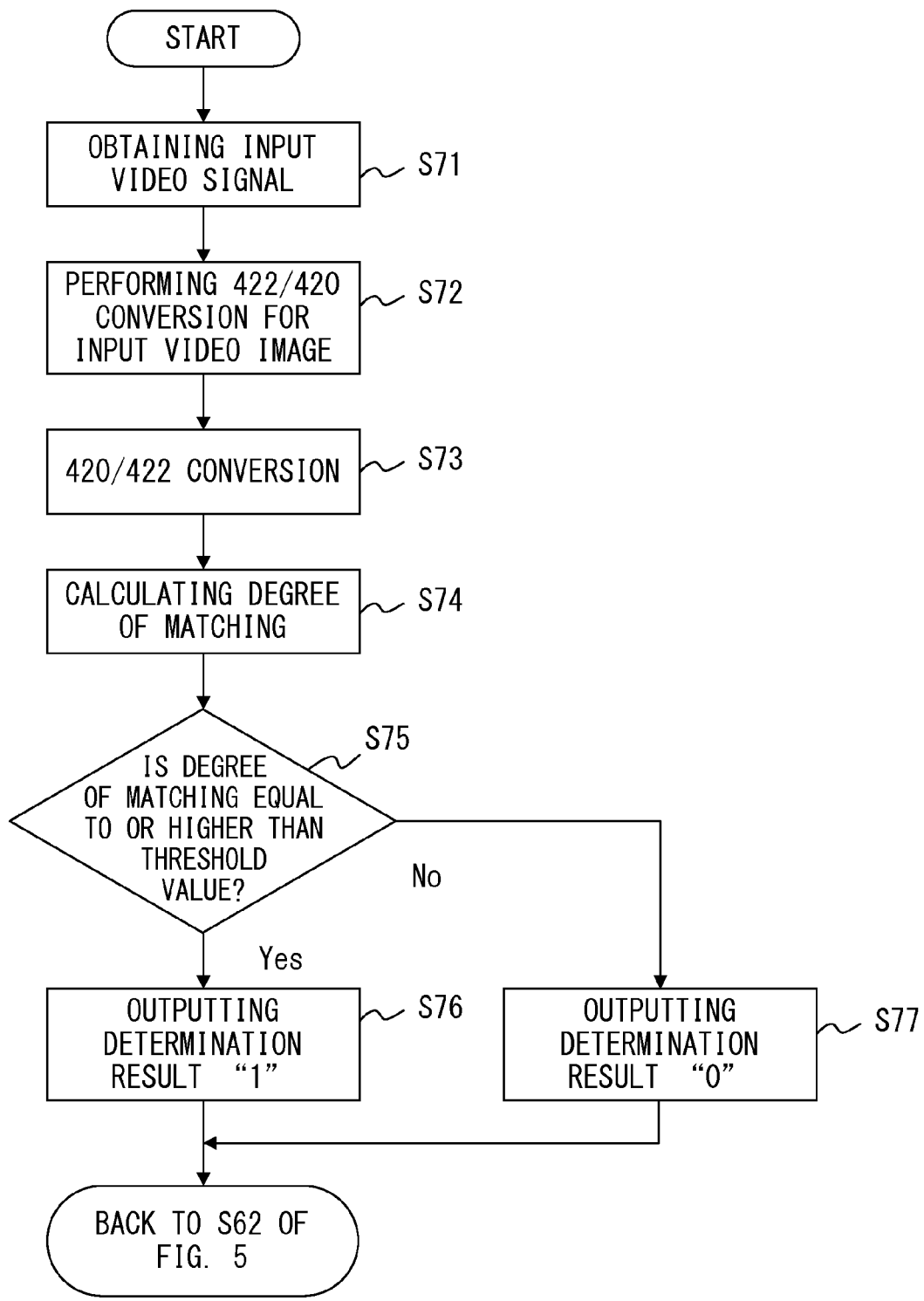
FIG. 6 is a flowchart illustrating operations of the determination of the video signal in the video encoding apparatus according to the first embodiment.

Operations of the determination and the encoding of a video signal in the video encoding apparatus 1 according to the first embodiment are described next with reference to FIGS. 5 to 10. FIG. 5 is a flowchart illustrating the operations of the determination and the encoding of the video signal in the video encoding apparatus 1 according to the first embodiment. FIG. 6 is a flowchart illustrating the operations of the determination of a video signal in the video encoding apparatus 1 according to the first embodiment.

As illustrated in FIG. 5, a video determination process for determining whether or not 420/422 conversion at a preceding stage is performed for an input video signal by using a stipulated filter in the determination and the encoding of the video encoding apparatus 1 according to the first embodiment (S61). When the video determination unit 5 outputs a determination result, the moving image encoding unit 9 of the encoding unit 3 encodes the video signal for which the 422/420 conversion has been performed, and the determination result input from the video determination unit 5 (S62).

Details of the operations of the video determination process in S61 in the first embodiment are described next with reference to FIG. 6. As illustrated in FIG. 6, the video encoding apparatus 1 initially obtains an input video signal via an input end 11 (S71). Here, assume that the 420/422 conversion has been performed for the input signal at the preceding stage. The 422/420 conversion unit 7 shared by the encoding unit 3 and the video determination unit 5 converts the obtained input video signal in the YUV422 format into that in the YUV420 format (S72).

Here, the 422/420 conversion performed by the 422/420 conversion unit 7 is described with reference to FIG. 7. FIG. 7 is an explanatory diagram of the conversion of a video signal from the YUV422 format into the YUV420 format via a stipulated low-frequency analysis filter A(z) 21. As illustrated in FIG. 7, the 422/420 conversion unit 7 filters, for example, color-difference components 29 of the video signal, which correspond to line 1, line 1, . . . , line 2N of the video signal in the YUV422 format, with the low-frequency analysis filter A(z) 21. The low-frequency analysis filter A(z) 21 outputs color-difference components 31 corresponding to the filtered line 1', line 2', . . . , line (2N)'. The down-sampling unit 23 down-samples the color-difference components 31 at 2:1 in the vertical direction by sampling the color-difference components 31 every other line in the vertical direction, and obtains color-difference components 33 corresponding to the line 1', line 3', . . . , line (2N–1)'. In this way, the 422/420 conversion unit 7 converts an input video signal in the YUV422 format into that in the YUV420 format. The 422/420 conversion unit 7 transmits the video signal converted into the YUV420 format to the moving image encoding unit 9 and the 420/422 conversion unit 13.

Figure 8:
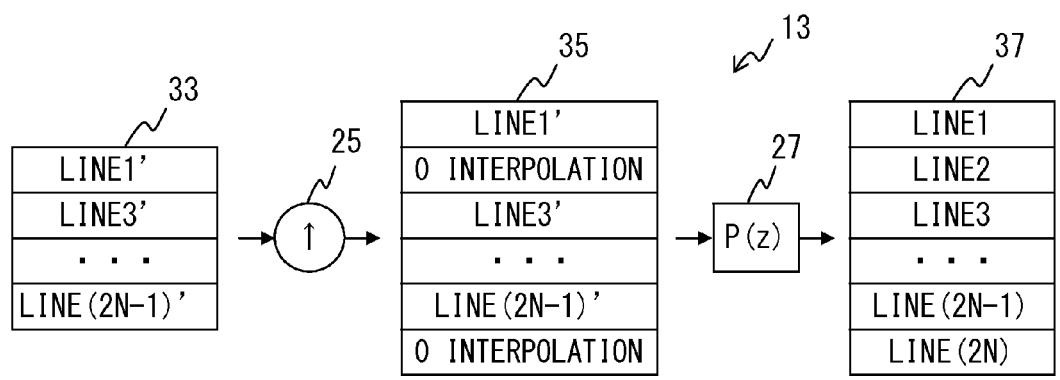
FIG. 8 is an explanatory diagram of conversion from the YUV420 format into the YUV422 format via a stipulated low-frequency synthesis filter $P(z)$ according to the first embodiment.

Turning back to FIG. 6. In the video determination unit 5, the 420/422 conversion unit 13 converts the video signal in the YUV420 format converted in S72 into that in the YUV422 format (S73). Here, the 420/422 conversion performed by the 420/422 conversion unit 13 is described with reference to FIG. 8. FIG. 8 is an explanatory diagram of the conversion of a video signal from the YUV420 format into the YUV422 format via a stipulated low-frequency synthesis filter P(z) 27. As illustrated in FIG. 8, the up-sampling unit 25 of the 420/422 conversion unit 13 up-samples color-difference components 33 converted by the 422/420 conversion unit 7 at 1:2 in the vertical direction. Namely, the up-sampling unit 25 generates color-difference components 35 by interpolating one line having a pixel value of "0" between lines of the color-difference components 33, which correspond to line 1', line 2', . . . , line (2N)' of the video signal in the YUV420 format. Moreover, the 420/422 conversion unit 13 generates color-difference components 37 corresponding to line 1, line 2, . . . , line 2N by filtering the up-sampled color-difference components 35 with the stipulated low frequency synthesis filter P(z) 27 in the vertical direction. In this way, the 420/422 conversion unit 13 generates a video signal for a determination from an input video signal, and transmits the generated signal to the matching degree calculation unit 15.

Turning back to FIG. 6. In the video determination unit 5, the matching degree calculation unit 15 calculates the degree of matching based on color-difference components of the input video signal in the YUV422 format obtained in S71 and those of the video signal for the determination in the YUV422 format converted in S73 (S74). As a method for calculating the degree of matching, for example, any of the following three calculation methods is used.

degree of matching 1)

degree of matching 1=10 log $(MAX^2/MSE)$ where $MSE = \Sigma\Sigma |a(i,j)-b(i,j)|^2/(m \cdot n)$.

degree of matching 2)

degree of matching $2=1/(\Sigma\Sigma|a(i,j)-b(i,j)|^2/(m\cdot n))$ degree of matching 3)

degree of matching $3=1/(\Sigma\Sigma|a(i,j)-b(i,j)|)$

Here, a(i,j) is a pixel value of a color-difference component at a pixel (i,j) of the input video image, and b (i,j) is a pixel value of a color-difference component at a pixel (i,j) of the video image for the determination. m is the number of pixels in the horizontal direction of the input video image and the video image for the determination, and n is the number of pixels in the vertical direction of the input video image and the video image for the determination. MAX is a maximum grayscale value of a pixel value of a color-difference component. For example, if a color-difference component is represented with 8 bits, MAX=255. Moreover, $\Sigma\Sigma$ represents a total sum of i from 1 to m and j from 1 to n.

The degree of matching 1 is a value that represents Peak Signal-to-Noise-Ratio (PSNR) of a pixel value. The degree of matching 2 is an inverse number of Mean Square Error (MSE). Moreover, the degree of matching 3 is an inverse number of Sum of Absolute Differences (SAD) of pixel values.

The degrees of matching 1 to 3 (collectively referred to as the degree of matching) are values based on an absolute value of a difference between color-difference components of corresponding pixels of an input video image and a video image for a determination. The degree of matching increases as a difference between an input video image and a video signal for a determination decreases. The matching degree calculation unit 15 transmits a calculated degree of matching to the filter determination unit 19.

The filter determination unit 19 provides threshold values respectively for the degrees of matching calculated by the matching degree calculation unit 15. If the degree of matching is equal to or higher than a threshold value, this indicates that degradation of a color-difference component and a shift of a color-difference pixel, which are caused by the 420/422 conversion at a stage preceding an input of a video image to the video encoding apparatus 1, are reduced to a certain level or lower. If the degree of matching is equal to or higher than the threshold value, the filter determination unit 19 determines that the input video image has been converted from the YUV420 format into the YUV422 format by the low-frequency synthesis filter P(z), which is a stipulated filter, with the 420/422 conversion at the preceding stage ("YES" in S75). Then, the filter determination unit 19 outputs an output signal "1" as a determination result (S76). If the degree of matching is lower than the threshold value, the filter determination unit 19 determines that the input video image has been converted via a filter other than the stipulated filter with the conversion performed in the preceding state ("NO" in S75), and outputs an output signal "0" as a determination result (S77).

As described above, the video determination unit 5 determines whether or not an input video image is that converted from the YUV420 format into the YUV422 format with the low-frequency synthesis filter P(z), which is a stipulated filter, at the preceding state based on only the input video image in the YUV422 format. The video determination unit 5 transmits a determination result to the encoding unit 3.

Operations of video signal encoding performed in the video encoding apparatus 1 according to the first embodiment are described next. In the video encoding apparatus 1, a result of the video determination unit 5 is input to the encoding unit 3 as illustrated in FIG. 1, and the determination result of the video determination unit 5 is included in an encoded string. Encoding of the determination result can be performed, for example, with the following method.

Assume that an input video signal is encoded in conformity with ITU-T H.264 in the encoding according to the first embodiment. At this time, the moving image encoding unit 9 encodes the determination result of the filter determination unit 19 with unregistered user data (user_data_unregistered) SEI (Supplemental Enhancement Information). The unregistered user data SEI is additional information that enables arbitrary data to be encoded, and syntax of the unregistered user data SEI is defined as represented by a table 63 illustrated in FIG. 9 in the ITU-T H.264 standard documents.

In the table 63, an entry represented by the table 63 are written in a first column. A second column represents a category. Each category is a number associated with each syntax element, and used to stipulate an assignment of the syntax element to a Network Abstraction Layer(NAL) unit. For example, "5" represents a syntax element included in SEI (Supplemental Enhancement Information). A third column is a "descriptor", which represents an identifier, and stipulates a syntax analysis process of the syntax element.

uuid_iso_iec_11578 written in the first column from the left and a second row from the top of the table 63 has a value stipulated as UUID (Universally Unique Identifier) in accordance with a procedure of ISO/IEC 11578:1996 Annex A. user_data_payload_byte written in the first column and a fourth row from the top of the table 63 is 1 byte that includes data having syntax and a meaning stipulated by a person who has generated UUID. The moving image encoding unit 9 assigns the determination result output by the filter determination unit 19 to the user_data_payload_byte. If the determination result is represented with prf_used_flag, the syntax of the unregistered user data SEI results in that represented by a table 64 of FIG. 10. As represented by the table 64, prf_used_flag can be defined as a flag that represents the determination result of the video determination unit 5. A value of the flag is "1" if the determination result of the filter determination unit 19 is "1", or "0" if the determination result is "0".

An example of a code string that indicates the determination result is represented with hexadecimal byte data. Assuming that data of uuid_iso_iec_11578 is "00 11 22 33 44 55 66 77 88 99 AA BB CC DD EE FF", the code string is encoded as follows.
(1) case where the determination result is "1" first encoded string: 00 11 22 33 44 55 66 77 88 99 AA BB CC DD EE FF 01
(2) case where the determination result is "0" second encoded string: 00 11 22 33 44 55 66 77 88 99 AA BB CC DD EE FF 00

In this way, the determination result can be included in the encoded string.

As described above, in the moving image encoding unit 9 of the encoding unit 3, the determination result is encoded, for example, into the above described first or second encoded string, and the video signal in the YUV420 format is output from the output end 28 along with the encoded string.

Figure 11:
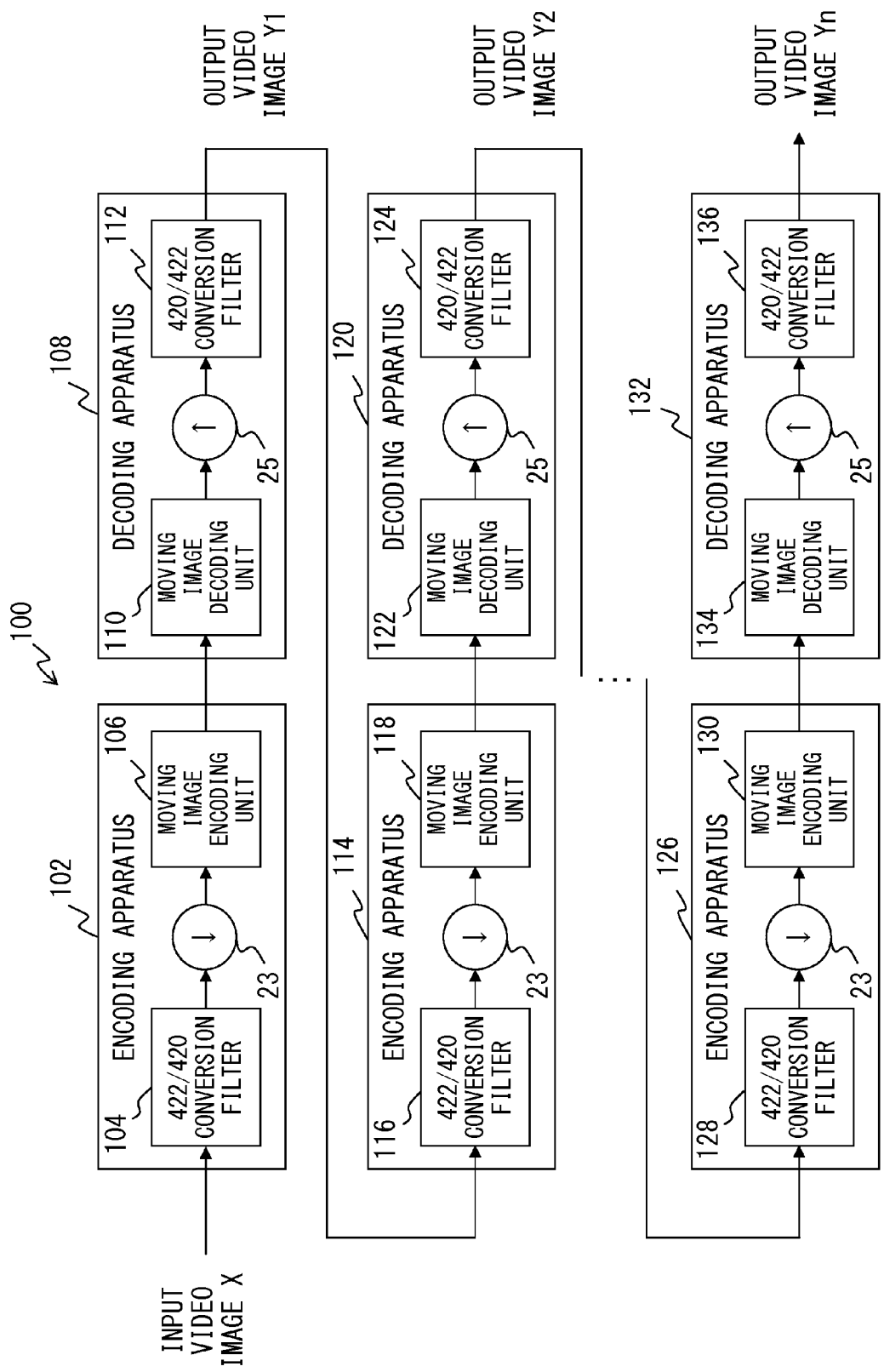
FIG. 11 illustrates a state of conversion between the YUV422 format and the YUV420 format of a video signal in a repetitive encoding system according to the first embodiment.

Usage examples of the encoded strings including the determination result output by the video encoding apparatus 1 are described next with reference to FIGS. 11 and 12. FIG. 11 illustrates a state of conversion between the YUV422 format and the YUV420 format of a video signal by a repetitive encoding system 100. The repetitive encoding system 100 is one example of a system of repetitive encoding of a video signal when the video image is relayed, edited, or the like. As illustrated in FIG. 11, the repetitive encoding system 100 is a system where an encoding apparatus 102, a decoding apparatus 108, an encoding apparatus 114, a decoding apparatus 120, . . . , an encoding apparatus 126, and a decoding apparatus 132 are sequentially connected by n stages.

The encoding apparatus 102 includes a 422/420 conversion filter 104, the down-sampling unit 23, and an encoding unit 106. The encoding apparatus 102 performs 422/420 conversion for an input video image X with a camera, and encodes and outputs the video image. The decoding apparatus 108 includes a decoding unit 110, the up-sampling unit 25, and a 420/422 filter 112. The decoding apparatus 108 decodes the video image converted by the encoding apparatus 102, up-samples the video image, performs the 420/422 conversion for the video image, and outputs the video image as an output video image Y1 in the YUV422 format. Each of the encoding apparatuses 114, 126 and the like similarly includes a 422/420 conversion filter 116, 128, the down-sampling unit 23, and an encoding unit 118, 130 and the like. Each of the decoding apparatuses 120, 132 and the like includes a decoding unit 122, 134, the up-sampling unit 25, a 420/422 conversion filter 124, 136 and the like. The repetitive encoding system 100 repetitively performs the 422/420 conversion and the 420/422 conversion for the input video image X, and outputs an output video image Yn.

A case where the 422/420 conversion filter 104, 116, . . . , 128 is the stipulated low-frequency analysis filter A(z), and the 420/422 conversion filter 112, 124, . . . , 136 is the stipulated low-frequency synthesis filter P(z) in the repetitive encoding system 100 is considered. In this case, degradation of color differences caused by repetitively performing the 422/420 conversion and the 420/422 conversion of output signals Y1 to Yn as described above can be reduced to a minimum. In the meantime, if a filter, which does not satisfy the stipulated condition, other than the low-frequency analysis filter A(z) and the low-frequency synthesis filter P(z) is used at any position within the repetitive encoding system 100, color differences are significantly degraded at that position.

A case where, for example, the encoding apparatus 114 is replaced with the video encoding apparatus 1 according to the first embodiment in such a repetitive encoding system 100 is considered. At this time, an encoded string including the first encoded string or the second encoded string is output from the video encoding apparatus 1. If the first encoded string is proved to be included when the output encoded string is decoded by the decoding apparatus 120, the decoding apparatus 108 at the preceding stage of the video encoding apparatus 1 determines that a video image has been converted by the stipulated filters. If the second encoded string is proved to be included in the output encoded string, the decoding apparatus 108 at the preceding stage of the video encoding apparatus 1 determines that the video image has been converted by a filter other than the stipulated filters.

There may be cases where, for example, a storage device is connected to a stage succeeding the encoding apparatus 114, an encoded string output from the encoding apparatus 114 is stored, and the stored encoded string is later read and used in the repetitive encoding system 100. In such cases, if the encoding apparatus 114 immediately preceding the storage device is replaced with the video encoding apparatus 1 according to the first embodiment, the output encoded string includes the first encoded string or the second encoded string as described above. Namely, the stored encoded string includes information indicating whether or not the video image has been converted with stipulated filters in the decoding apparatus 108.

Figure 12:
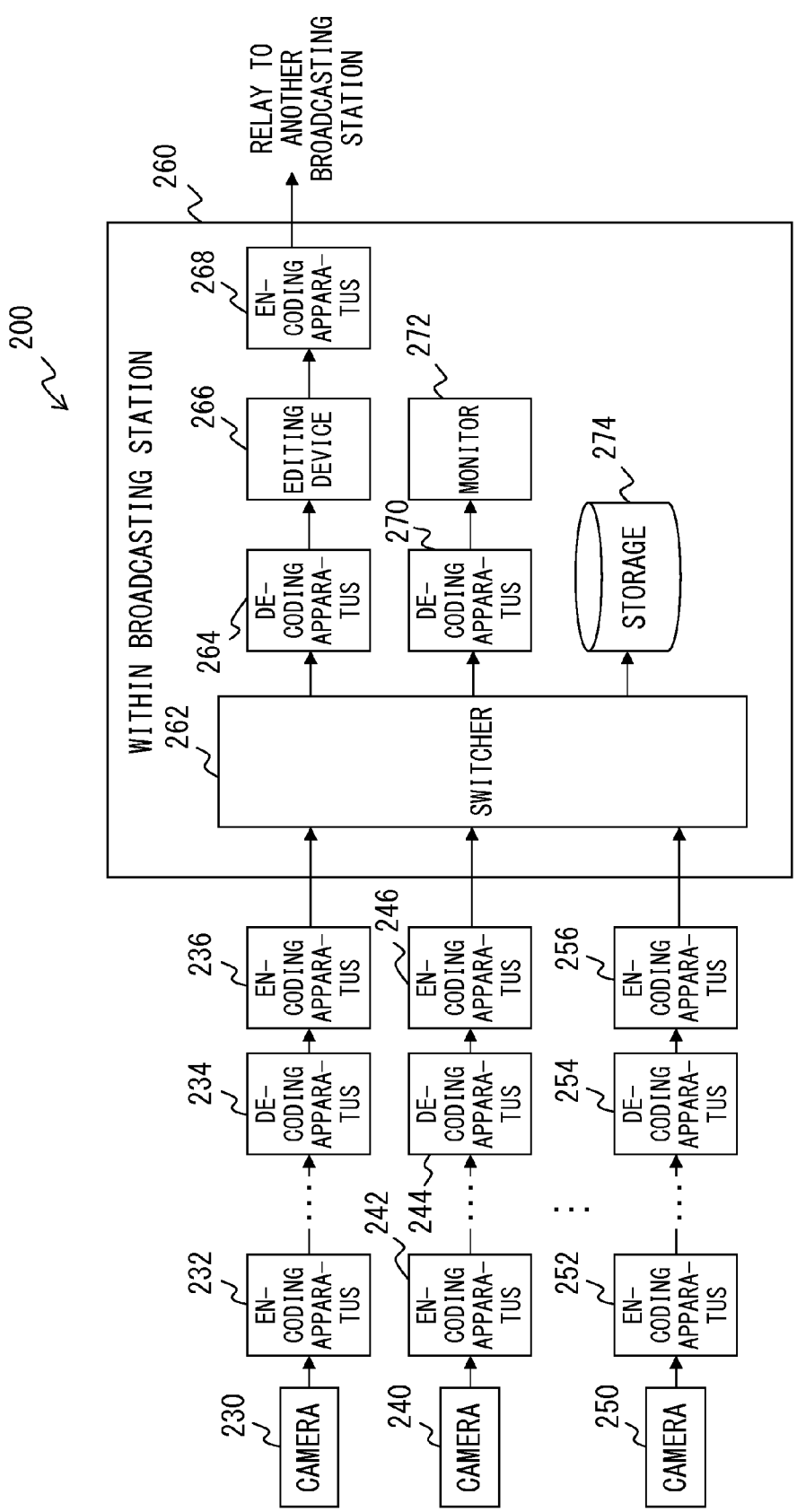
FIG. 12 is an explanatory diagram of usage of a video signal in a video switching system according to the first embodiment.

FIG. 12 is an explanatory diagram of usage of a video signal in a video switching system 200. The video switching system 200 is one example of a system for switching an encoded string. As illustrated in FIG. 12, the video switching system 200 includes a plurality of cameras 230, 240, . . . , 250, and a broadcasting station 260. The plurality of cameras 230, 240, . . . 250 are connected to the broadcasting station 260 via many encoding apparatuses 232, 242, . . . , 252 and decoding apparatuses 234, 244, . . . , 254. The broadcasting station 260 includes a switcher 262, decoding apparatuses 264, 270, an editing device 266, a monitor 272, a storage 274, and an encoding apparatus 268.

In the video switching system 200, video images shot by the plurality of cameras 230, 240, . . . , 250 are transmitted to the broadcasting station 260 via the many encoding apparatuses 232, 242, . . . , 252 and decoding apparatuses 234, 244, . . . , 254. For example, when a video image is relayed, the switcher 262 sometimes switches between systems of the video images from the plurality of cameras 230 to 250. Moreover, the transmitted video image is stored in the storage 274, and later used by the editing device 266, the monitor 272 or the like in some cases.

In the video switching system 200, for example, if encoding apparatuses 236, 246, . . . , 256, and the like are replaced with the video encoding apparatus 1 according to the first embodiment, all encoded strings input to the switcher 262 include the above described first encoded string or second encoded string. Namely, the encoded strings input to the switcher 262 include a determination result indicating whether or not a video image has been converted with stipulated filters by the decoding apparatuses 234, 244, . . . , 254. Moreover, at this time, also the encoded strings input to the decoding apparatus 264, 270, the storage 274 and the like include the determination result.

As described above in detail, with the video signal encoding apparatus according to the first embodiment, the 422/420 conversion is performed for an input video signal by the 422/420 conversion unit 7 with the stipulated low-frequency analysis filter A(z) 21. The 420/422 conversion unit 13 generates a video signal for a determination by performing the 420/422 conversion for the video signal converted into the YUV420 format with the stipulated low-frequency synthesis filter P(z) 27. The matching degree calculation unit 15 calculates the degree of matching between the input video signal and the video signal for the determination. The filter determination unit 19 determines that the input video signal has been converted by using the low-frequency synthesis filter P(z), which is a stipulated filter, at the preceding stage if the degree of matching is equal to or higher than the threshold value. If the degree of matching is lower than the threshold value, the filter determination unit 19 determines that the input video signal has been converted by using a filter other than the stipulated filter at the preceding stage. The encoding unit 3 encodes the video signal in the YUV422 format converted by the 422/420 conversion unit 7, and the determination result, and outputs the encoded signal and the determination result as an encoded string from the output end 28. The configuration of the video encoding apparatus 1 illustrated in FIG. 1 may be implemented with hardware, or may be implemented as a program executed by a computer.

In the repetitive encoding system 100, the video switching system 200, and the like, the video encoding apparatus 1 can be used as a replacement for each of the encoding apparatuses 114, 126, 232, ..., 236, ..., 256, 268, and the like. With such a configuration, an encoded string of a video signal having an encoded string indicating whether or not a video image has been converted with a stipulate filter is used in the repetitive encoding system 100, the video switching system 200 and the like. For example, in the above described repetitive encoding system 100, video switching system 200, and the like, the determination result of the video determination unit 5 is recognized when a stored encoded string is later used. If the encoded string output from the video encoding apparatus 1 includes the second encoded string, the 420/422 conversion filter immediately preceding the video encoding apparatus 1 is identified as a filter other than the stipulated filter. Moreover, the encoded string including the second encoded string is determined as an encoded string of a video signal converted by a filter other than the stipulated filter at the preceding stage.

As described above, with the video encoding apparatus 1, the video signal encoding method and program according to the first embodiment, whether or not an input video signal input to the video encoding apparatus 1 has been converted by 420/422 conversion at the preceding stage with the use of a stipulated filter can be determined. Moreover, the video encoding apparatus 1 can be used as a replacement for the encoding apparatuses 108, 120, 132, 236, 246, 256 and the like in the repetitive encoding system 100, the video switching system 200 or the like. If the video encoding apparatus 1 according to the first embodiment can determine whether or not a video image input to the video encoding apparatus 1 is that converted by using the stipulated filter, the encoding apparatus encodes the determination result, so that also a decoding apparatus can learn the determination result. As a result, whether or not the stipulated filters are used at each of sites of the encoding apparatus and the decoding apparatus can be determined, whereby a position of a low frequency synthesis filter using a filter other than the stipulated filter can be identified.

In the repetitive encoding system 100, the video switching system 200 or the like, whether or not a video image has been converted by stipulated filters can be determined even after an encoded string is stored for a long time. Whether or not a stored encoded string has been converted by stipulated filters can be determined, so that the encoded string can be passed to a decoding apparatus or the like at a succeeding stage without concern for degradation of color differences. Moreover, if it is determined that a video image is that converted by a filter other than a stipulated filter as a result of the determination, an image quality improvement process (such as an enhancement process for color differences by taking filter coefficients into account) for compensating for degradation and a pixel shift of a color-difference signal can be executed. Moreover, a video image can be displayed after executing an optimum image quality improvement process when a stored encoded string is decoded to display the video image.

In the video switching system 200 or the like, whether or not an encoded string after being switched is that converted by stipulated filters can be determined when the encoded string is switched by the switcher 262 or the like. Accordingly, the determination result can be used as one of indices of a quality check of an encoded string.

With the video signal encoding apparatus and video signal encoding method according to the above described embodiment, whether or not a video image is that converted by a filter different from a stipulated filter, and where the different filter is used when the video image is converted by using the different filter can be automatically determined.

Note that the degree of matching is not limited to the above described three types, and may be a value represented with another expression as long as the value can represent the degree of matching.

Figure 13:
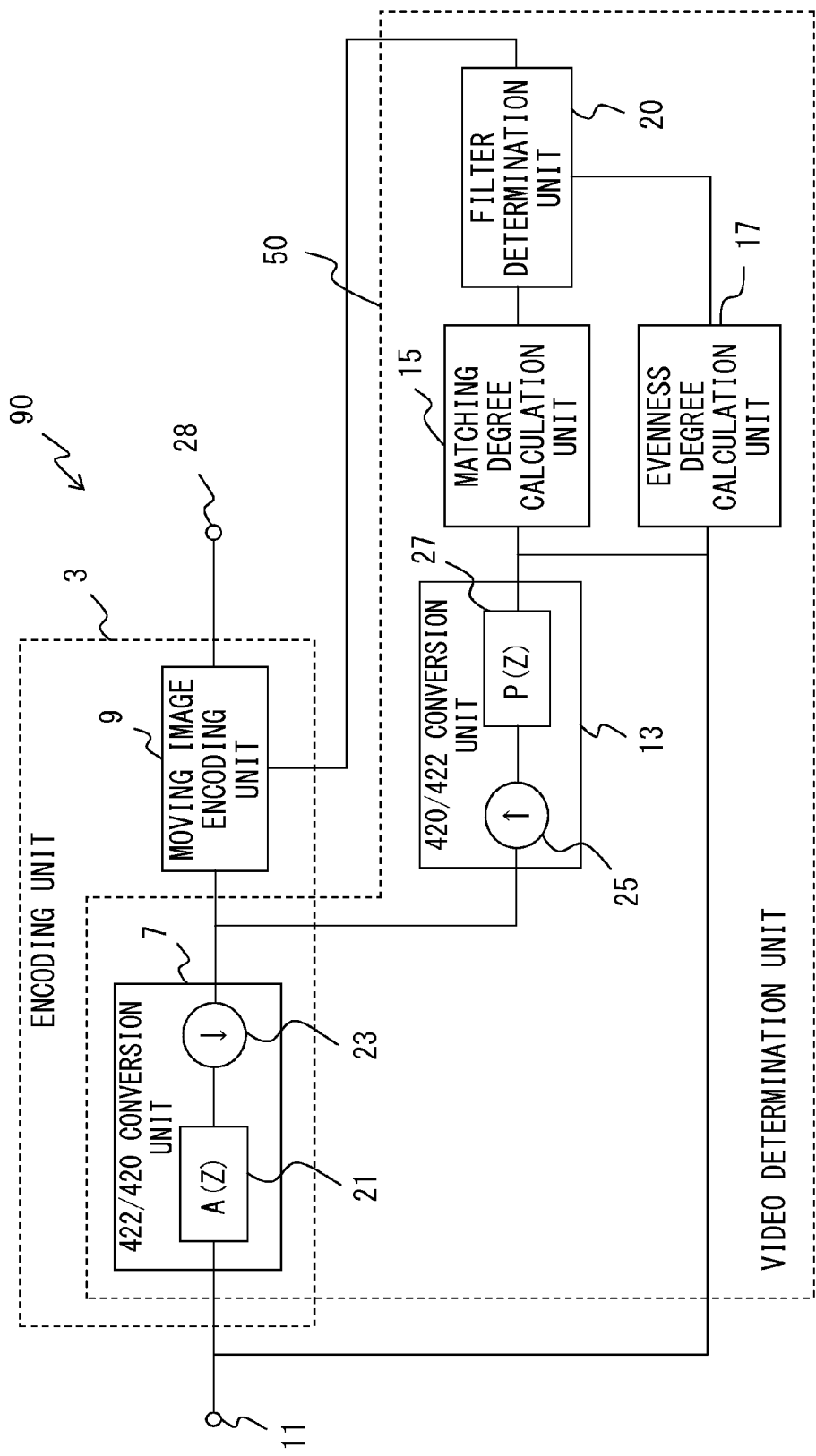
FIG. 13 is a block diagram illustrating a configuration of a video encoding apparatus according to a second embodiment.

(Second Embodiment) A video signal encoding apparatus, a video signal encoding method and program according to a second embodiment are described below with reference to the drawings. The same components as those of the first embodiment are denoted with the same reference numerals, and their redundant descriptions are omitted. FIG. 13 is a block diagram illustrating a configuration of the video encoding apparatus 90 according to the second embodiment. The video encoding apparatus 90 has functions of the encoding unit 3 and a video determination unit 50. The video encoding apparatus 90 according to the second embodiment is an apparatus implemented by replacing the video determination unit 5 with a video determination unit 50 in the video encoding apparatus 1 according to the first embodiment.

The video determination unit 50 includes the 422/420 conversion unit 7 shared by the encoding unit 3, the 420/422 conversion unit 13, and the matching degree calculation unit 15 similarly to the video determination unit 5. The video determination unit 50 further includes a filter determination unit 20 as a replacement for the filter determination unit 19 according to the first embodiment, and also includes an evenness degree calculation unit 17.

The evenness degree calculation unit 17 calculates the degree of evenness of an input video signal, and transmits the calculated degree to the filter determination unit 20. The filter determination unit 20 determines whether or not the input video signal has been converted by a stipulated filter at a preceding stage in accordance with the degree of matching calculated by the matching degree calculation unit 15 and the degree of evenness calculated by the evenness degree calculation unit 17.

Figure 14:
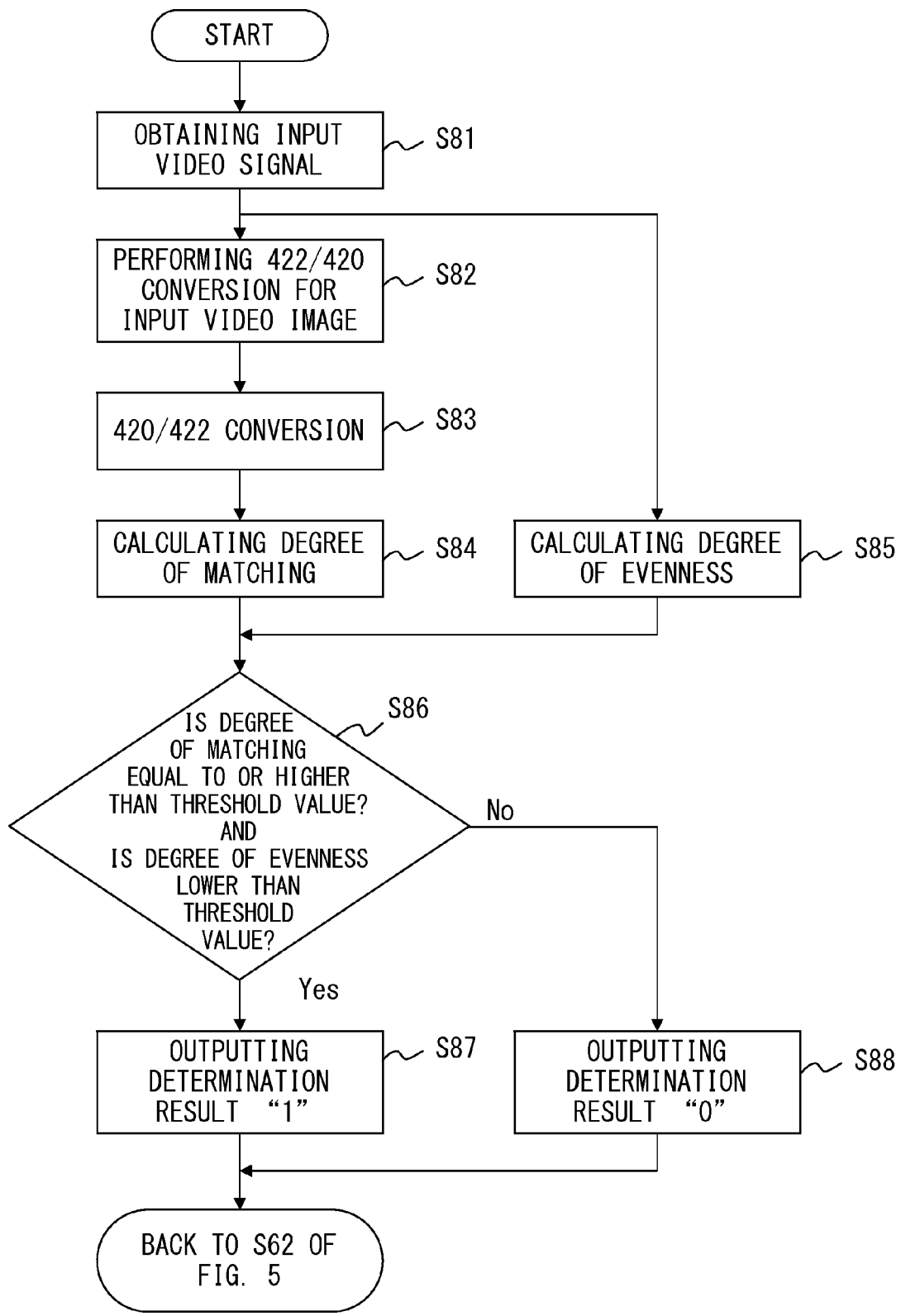
FIG. 14 is a flowchart illustrating operations of a determination and encoding of a video signal, which are performed by the video encoding apparatus according to the second embodiment.

Operations of the determination and the encoding of a video signal in the video encoding apparatus 90 according to the second embodiment are described next with reference to FIG. 14. FIG. 14 is a flowchart illustrating the operations of the determination and the encoding of a video signal in the video encoding apparatus 90 according to the second embodiment. Since S81 to S84 of FIG. 14 are similar to operations of S71 to S74 of FIG. 5, their descriptions are omitted.

In S85 of FIG. 14, the evenness degree calculation unit 17 of the video determination unit 50 calculates the degree of evenness by using color-difference components of the input video signal in the YUV422 format obtained in S81 (S85). For example, any of the following three calculation methods is used as a method for calculating the degree of evenness.
degree of evenness 1)
degree of evenness $1 = 1/\Sigma\Sigma(\text{mean pixel value} - a(i,j))^2$
where mean pixel value $= 1/(m \cdot n)\Sigma\Sigma a\ (i,j)$, $a(i,j)$ is a pixel value of a color-difference component at a pixel $(i,j)$ of the input video image, m is the number of pixels of the input video image in a horizontal direction, n is the number of pixels of the input video image in a vertical direction, and $\Sigma\Sigma$ is a total sum of i from 1 to m and j from 1 to n.

degree of evenness 2) degree of evenness 2=inverse number of a sum of pixel values of a video image after filtering color-difference components of the input video signal with a high-pass filter having a low cutoff frequency such as $\pi/16$ degree of evenness 3) degree of evenness $2 = (C0 + C1 + \ldots + C15)/(C1 + C2 + \ldots + C15)$
where C0 to C15 are discrete cosine transform coefficients.

The degree of evenness 1 represents an inverse number of a sum of square errors from a mean value of pixel values of color-difference components, the degree of evenness 2 represents an inverse number of a sum of pixel values at a cutoff frequency and higher, and the degree of evenness 3 represents an inverse number of a ratio of coefficients other than a direct current component to a sum of coefficients when a discrete cosine transform is performed for the input video image. All the degrees of evenness increase as pixel components are more even in the input video signal. The evenness degree calculation unit 17 transmits, to the filter determination unit 20 any of the degrees of evenness (collectively referred to also as the degree of evenness) calculated as described above.

The filter determination unit 20 provides threshold values respectively for the degrees of matching calculated by the matching degree calculation unit 15 similarly to the filter determination unit 19 according to the first embodiment. Also for the degrees of evenness calculated by the evenness degree calculation unit 17, the filter determination unit 20 respectively provides threshold values. The degree of evenness, which is lower than the threshold value, indicates that a hue of an input video image is complex at a certain level. For example, if the degree of evenness increases, a video image finally results in an image of one color. However, it is sometimes difficult to accurately detect degradation of color-difference components from the video image of only one color based on the degree of matching. Therefore, the filter determination unit 20 uses, for a determination, the degree of evenness in addition to the degree of matching.

The filter determination unit 20 determines that the input video image has been converted from the YUV420 format into the YUV422 format by the low-frequency synthesis filter P(z), which is a stipulated filter, at the preceding stage if the degree of matching is equal to or higher than the threshold value and the degree of evenness is lower than the threshold value ("YES" in S86). Then, the filter determination unit 20 outputs an output signal "1" as a determination result (S87). If the degree of matching is lower than the threshold value or the degree of evenness is equal to or higher than the threshold value, the filter determination unit 20 determines that the input video image has been converted via a filter other than the stipulated filter at the preceding stage ("NO" in S86), and outputs an output signal "0" as a determination result (S88). Then, the flow goes back to S62 of FIG. 5.

As described above, whether or not an input video signal corresponds to a video image converted from the YUV420 format into the YUV422 format by the low-frequency synthesis filter P(z), which is a stipulated filter, at the preceding stage can be determined only based on the input video image in the YUV422 format.

The video determination unit 50 transmits the determination result to the encoding unit 3. The moving image encoding unit 9 of the encoding unit 3 encodes the determination result input from the video determination unit 50 along with the video signal obtained by performing the 422/420 conversion for the input image into a specified format (S62). As the encoding, for example, the method illustrated in FIGS. 9 and 10 in the first embodiment can be applied. Therefore, in the moving image encoding unit 9 of the encoding unit 3, a determination result is encoded and output from the output end 28 along with an encoded string obtained by encoding an input video signal similarly to the video encoding apparatus 1 according to the first embodiment.

Additionally, similarly to the video encoding apparatus 1 according to the first embodiment, the video encoding apparatus 90 according to the second embodiment can be used as a replacement for an encoding apparatus in the repetitive encoding system 100 or the video switching system 200.

As described above, with the video signal encoding apparatus according to the second embodiment, the evenness degree calculation unit 17 calculates the degree of evenness by using an input video signal. The filter determination unit 20 determines that the input video signal has been converted by using the low-frequency synthesis filter P(z), which is a stipulated filter, at a preceding stage when the degree of matching is equal to or higher than a threshold value and the degree of evenness is lower than a threshold value. The filter determination unit 20 determines that the input video signal has been converted by using a filter other than the stipulated filter at the preceding stage when the degree of matching is lower than the threshold value or the degree of evenness is equal to or higher than the threshold value . The moving image encoding unit 9 of the encoding unit 3 encodes the video signal in the YUV422 format converted by the 422/420 conversion unit 7, and a determination result, and outputs the encoded image and the determination result from the output end 28 as an encoded string.

As described above, the video signal encoding apparatus, the video signal encoding method and program according to the second embodiment produce action effects similar to those of the video signal encoding apparatus, the video signal encoding method and program according to the first embodiment. Moreover, if color-difference components of an input video signal are nearly even, by calculating the degree of evenness of the input video image, whether or not a video image has been converted can be determined with more accuracy than in a case where whether or not a video image has been converted only based on the degree of matching.

The three types of the degree of matching referred to in the first embodiment, and the three types of the degree of evenness referred to in the second embodiment can be arbitrarily combined. For example, 9 types of combinations, such as a combination of the degree of matching 1 and the degree of evenness 3, the degree of matching 2 and the degree of evenness 1, and the like, can be made. Moreover, the degree of matching and the degree of evenness are not limited to the above described three types, respectively. The degree of matching or the degree of evenness may be a value represented by another expression as long as the value can represent the degree of matching or the degree of evenness. At this time, another degree of matching and another degree of evenness can be arbitrarily combined.

(Third Embodiment) A video signal encoding apparatus, video signal encoding method and program according to a third embodiment are described below with reference to FIGS. 15 and 16. FIGS. 15 and 16 illustrate a table representing syntax related to encoding of a determination result in the third embodiment. The video signal encoding apparatus, the video signal encoding method and program according to the third embodiment are another implementation of the video signal encoding apparatus, the video signal encoding method and program according to the first and the second embodiments.

Assume that a video signal is encoded in conformity with H.264 also in the third embodiment. In the third embodiment, the video encoding apparatus 1 or the video encoding apparatus 90 transmits a determination result as a Video Usability Information (VUI) parameter of a sequence parameter set. The ITU-T H.264 standard documents stipulate syntax of the sequence parameter set as represented by a table 66 of FIG. 15.

In a first column of the table 66, an entry represented by the table 66 is written. A second column represents a category. Each category is a number associated with each syntax element. For example, "0" indicates a syntax element included in the sequence parameter set. A third column represents a descriptor, which represents an identifier, and stipulates a syntax analysis process of the syntax element. For example, u(n) represents an unsigned integer using n bits, and b(8) represents a byte having a bit code string of an arbitrary pattern.

If vui_parameters_present_flag written in the third column from the top of the table 66 is "1", this indicates that vui_parameters ( ) is present. If vui_parameters_present_flag is "0", this indicates that vui_parameters ( ) is not present. vui_parameters ( ) written in a fifth row of the table 66 is data that satisfies VUI parameter syntax. Since arbitrary data that does not satisfy the VUI parameter syntax can be assigned to the portion of vui_parameters ( ), a determination result of a video is stored in this portion. Here, assuming that the determination result is prf_used_flag, the syntax of the sequence parameter set results in that represented by a table 67 of FIG. 16. As described above, prf_used_flag is a flag indicating the determination result of the video determination unit 5 or the video determination unit 50. The value of the flag is "1" if the determination result is "1", or "0" if the determination result is "0".

Examples of encoded strings in the third embodiment are represented below as binary bit string data. If the sequence parameter set is written with a bit string, it becomes complicated. Therefore, the encoded strings are represented by omitting portions preceding and succeeding the VUI parameter.

The first "1" in the bit string data in the examples is vui_parameters_present_flag.
(1) case where the determination result is "1" third encoded string: . . . 11 . . .
(2) case where the determination result is "0" fourth encoded string: . . . 10 . . .

In this way, the determination result can be included in the encoded strings.

As described above, with the video signal encoding method and program according to the third embodiment, the determination result can be encoded as described above. Note that the video signal encoding method and program according to the third embodiment can be implemented with any of the video encoding apparatus 1 according to the first embodiment and the video encoding apparatus 90 according to the second embodiment. Accordingly, the video signal encoding apparatus, the video signal encoding method and program according to the third embodiment produce action effects similar to those of the video signal encoding apparatus, the video signal encoding method and program according to the first or the second embodiment.

(Fourth Embodiment) A video signal encoding apparatus, a video signal encoding method and program according to a fourth embodiment are described below with reference to FIGS. 17 and 18. FIGS. 17 and 18 illustrate a table representing syntax related to encoding of a determination result in the fourth embodiment. The video signal encoding apparatus, the video signal encoding method and program according to the fourth embodiment are another implementation of an encoding method of the video signal encoding apparatus, the video signal encoding method and program according to the first to the third embodiments.

The fourth embodiment refers to an example of encoding performed when encoded data of a video image is multiplexed with TS (Transport Stream). In this case, a descriptor is newly defined, and a determination is transmitted by the descriptor. The ITU-T H.222 standard documents stipulate that arbitrary data can be transmitted with TS as a descriptor of program_map_section. Syntax of the program_map_section is as represented by a table 68 of FIG. 17.

In a first column of the table 68, syntax is written. A second column is the number of bits, which represents the number of bits of a syntax element. A third column is "mnemonic", and represents a data type of the syntax element. For example, bslbf represents that the syntax element is a bit string (such as "1000 0001"), and uimsbf represents that the syntax element is an unsigned integer.

"descriptor ( )" written in a fifth row from the top of the table 68 can be defined by a user. Therefore, descriptor ( ) is defined as represented by a table 69 of FIG. 18, and a determination result of a video image is stored. "descriptor_tag" written in a third row from the top of the table 69 is an 8-bit field, and identifies each descriptor. In prf_used_flag_descriptor ( ) a value, defined by a user, between 64 and 255 is used. For example, 64 can be assigned.

"descriptor_length" written in a fourth row from the top of the table 69 is an 8-bit field, and stipulates the number of bytes of data immediately succeeding the descriptor_length field. The number of bytes of data is assumed to be "1" in prf_used_flag_descriptor ( ). "prf_used-flag" written in a fifth row from the top of the table 69 is a 1-bit field, and is a flag that represents a determination result of the video determination unit 5 or the video determination unit 50. A value of the flag is "1" if the determination result is "1", or "0" if the determination result is "0". "reserved" is a currently unused field. A value of "reserved" is defined as a binary number "111 1111".

An example of a code string of the descriptor is represented with hexadecimal byte data. In the example, descriptor_tag is assumed to be a hexadecimal number "40", and descripto_length is assumed to be a hexadecimal number "1".
(1) case where the determination result is "1" fifth encoded string: 40 01 FF
(2) case where the determination result is "0" sixth encoded string: 40 01 7F Byte data of this descriptor is inserted in the portion of descriptor ( ) within syntax of TS_program_map_section, and transmitted as PMT (Program Map Table). In this way, the determination result can be included in the encoded strings.

As described above, with the video signal encoding method and program according to the fourth embodiment, the determination result can be encoded in this way. The video signal encoding method and program according to the fourth embodiment can be implemented with any of the video encoding apparatus 1 according to the first embodiment and the video encoding apparatus 90 according to the second embodiment. Accordingly, the video signal encoding apparatus, the video signal encoding method and program according to the fourth embodiment produce action effects similar to those of the video signal encoding apparatus, the video signal encoding method and program according to the first or the second embodiment.

Here, an example of a computer applied in common to cause the computer to perform operations of the video signal encoding method according to the above described first to the fourth embodiments is described. FIG. 19 is a block diagram illustrating one example of a hardware configuration of a standard computer. As illustrated in FIG. 19, in the computer 300, a Central Processing Unit (CPU) 302, a memory 304, an input device 306, an output device 308, an external storage device 312, a medium driving device 314, a network connecting device, and the like are interconnected via a bus 310.

The CPU 302 is a processor for controlling operations of the entire computer 300. The memory 304 is a storage unit for prestoring a program for controlling the operations of the computer 300, and used as a working area if needed when the program is executed. The memory 304 is, for example, Random Access Memory (RAM), Read Only Memory (ROM) or the like. The input device 306 is a device for obtaining an input of each type of information from a user, which is made to correspond to content of an operation, when being operated by the user of the computer, and for transmitting the obtained input information to the CPU 302. The input device 306 is, for example, a keyboard device, a mouse device, or the like. The output device 308 is a device for outputting a result of a process executed by the computer 300, and includes a display device and the like. The display device displays, for example, a text or an image in accordance with display data transmitted from the CPU 302.

The external storage device 312 is a storage device such as a hard disk or the like, and stores various types of control programs executed by the CPU 302, obtained data, and the like. The medium driving device 314 is a device for writing/reading data to/from a portable recording medium 316. The CPU 302 can execute various types of control processes by reading and executing a specified control program recorded on the portable recording medium 316 via the recording medium driving device 314. The portable recording medium 316 is, for example, a compact disc (CD)-ROM, Digital Versatile Disk (DVD), Universal Serious Bus (USB) memory, or the like. The network connecting device 318 is an interface device for managing transmissions/receptions of various types of data to/from an outside wiredly or wirelessly. The bus 310 is a communication path for interconnecting the above described devices, and for exchanging data.

The program for causing the computer to execute the video signal encoding method according to the above described first to fourth embodiments is stored, for example, in the external storage device 312. The CPU 302 reads the program from the external storage device 312, and causes the computer 300 to perform operations of the video signal encoding. At this time, a control program for causing the CPU 302 to execute a video signal encoding process is initially created and stored in the external storage device 312. Then, a specified instruction is issued from the input device 306 to the CPU 302, which then reads this control program from the external storage device 312, and executes the program. Alternatively, this program may be stored on the portable recording medium 316.

As described above, the video signal encoding apparatus and the video signal encoding method, which can automatically determine whether or not a video image is that converted by a filter different from a filter that satisfies the above described condition, and where the different filter is used when the video image is converted by the different filter, are provided.

In the above described embodiments, the 422/420 conversion unit 7 and the 420/422 conversion unit 13 are one example of a determination video output unit, and the video encoding apparatuses 1 and 90 are one example of a video signal encoding apparatus. The perfect reconstruction filter is one example of a reconstruction filter.

Note that the stipulated filters are not limited to those illustrated in FIGS. 2 to 4, and any filters can be applied as long as the filters satisfy the above described condition.

The above described embodiments can be suitably combined. For example, modified embodiments such as an embodiment where the encoding according to the first embodiment is performed with the encoding method according to the third embodiment, and an embodiment where the video signal encoding apparatus 90 according to the second embodiment is replaced with the encoding apparatus 124 in the repetitive conversion system 100 according to the first embodiment can be implemented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A video signal encoding apparatus comprising:
a processor
configured to convert a first video signal in a first format having a luminance component and two color-difference components into a second video signal in a second format having a lower resolution of a color-difference component than the first video signal by using a first filter of one pair of filters that satisfy a stipulated condition, and to output a third video signal by converting the second video signal in the second format into the first format by using a second filter of the one pair of filters;
configured to calculate a degree of matching between pixel values of color-difference components of corresponding pixels respectively included in the first video signal and the third video signal;
configured to determine, in accordance with the degree of matching, whether the first video signal has been generated by using the one pair of filters that satisfy the stipulated condition, and to output a determination result; and
configured to generate an encoded string by encoding the second video signal and the determination result,
wherein the stipulated condition is that the one pair of filters enable a position shift of a color-difference pixel to fall within a specified error range even when a video signal, having the luminance component and the two color-difference components, is repetitively converted between the first format and the second format.

2. The video signal encoding apparatus according to claim 1, wherein the processor calculates a degree of evenness of the first video signal and determines whether or not the first video signal has been converted by using the filter that satisfies the stipulated condition in the conversion at the preceding stage in accordance with the degree of matching and the degree of evenness.

3. The video signal encoding apparatus according to claim 1, wherein the processor determines that the first video signal has been converted by the filter that satisfies the stipulated condition in the conversion at the preceding stage when the degree of matching is equal to or higher than a specified value.

4. The video signal encoding apparatus according to claim 2, wherein the processor
 determines that the first video signal has been converted by using the filter that satisfies the stipulated condition in the conversion at the preceding stage when the degree of matching is equal to or higher than a specified value and the degree of evenness is lower than a specified value, and
 determines that the first video signal has been converted by using a filter other than the filter that satisfies the stipulated condition in the conversion at the preceding stage when the degree of matching is lower than a specified value or the degree of evenness is equal to or higher than a specified value.

5. The video signal encoding apparatus according to claim 1, wherein the degree of matching is a value calculated based on an absolute value of a difference between pixel values of color-difference components of corresponding pixels of the first video signal and the third video signal.

6. The video signal encoding apparatus according to claim 2, wherein the degree of evenness is a value calculated based on a difference between a mean pixel value of color-difference components of the first video signal and each pixel value.

7. The video signal encoding apparatus according to claim 2, wherein the degree of evenness is a value calculated based on a component equal to or higher than a specified frequency of a color-difference component of the first video signal.

8. The video signal encoding apparatus according to claim 2, wherein the degree of evenness is a value calculated based on a coefficient when a discrete cosine transform is performed for a color-difference component of the first video signal.

9. The video signal encoding apparatus according to claim 1, wherein the first format is a YUV422 format, and the second format is a YUV420 format.

10. The video signal encoding apparatus according to claim 1, wherein the determination result is encoded as additional information that enables arbitrary data to be encoded in encoding of the second video signal.

11. The video signal encoding apparatus according to claim 1, wherein the determination result is encoded as a parameter that is used in encoding of the second video signal.

12. The video signal encoding apparatus according to claim 1, wherein the determination result is encoded by newly defining a descriptor in encoding of the second video signal.

13. The video signal encoding apparatus according to claim 1, wherein the processor generates the second video signal in a YUV420 format by down-sampling, at a ratio of 2 to 1, a fourth video signal obtained by filtering the first video signal with the first filter, and generates the third video signal converted into a YUV422 format by up-sampling, at a ratio of 1 to 2, a fifth video signal obtained by filtering the second video signal in the YUV420 format with the second filter.

14. A video signal encoding method comprising:
 converting, by a processor, a first video signal in a first format having a luminance component and two color-difference components into a second video signal in a second format having a lower resolution of a color-difference component than the first video signal in the first format by using a first filter of one pair of filters that satisfy a stipulated condition, and outputting a third video signal by converting the second video signal in the second format into the first format by using a second filter of the one pair of filters;
 calculating by the processor a degree of matching between pixel values of color-difference components of corresponding pixels respectively included in the first video signal and the third video signal;
 determining by the processor, in accordance with the degree of matching, whether the first video signal has been generated by using the one pair of filters that satisfy the stipulated condition, and outputting a determination result; and
 generating by the processor an encoded string by encoding the second video signal in the second format and the determination result,
 wherein the stipulated condition is that the one pair of filters enable a position shift of a color-difference pixel to fall within a specified error range even when the first video signal, having a luminance component and the two color-difference components, is repetitively converted between the first format and the second format.

15. A non-transitory computer-readable recording medium having stored therein a program for causing a computer to execute a video signal encoding process comprising:
 converting a first video signal in a first format having a luminance component and two color-difference components into a second video signal in a second format having a lower resolution of a color-difference component than the first video signal in the first format by using a first filter of one pair of filters that satisfy a stipulated condition, and outputting a third video signal by converting the second video signal in the second format into the first format by using a second filter of the one pair of filters that satisfy the stipulated condition, the stipulated condition being that the one pair of filters includes a reconstruction filter producing a position shift of a color-difference pixel within a specified error range when the first video signal, having the luminance component and the two color-difference components, is repetitively converted between the first format and the second format;
 calculating a degree of matching between pixel values of color-difference components of corresponding pixels respectively included in the first video signal and the third video signal;
 determining, in accordance with the degree of matching, whether the first video signal has been converted by using the reconstruction filter in accordance with the degree of matching, and outputting a determination result; and
 generating an encoded string by encoding the second video signal in the second format and the determination result.

* * * * *